(12) United States Patent
Arvidson et al.

(10) Patent No.: US 8,969,221 B2
(45) Date of Patent: Mar. 3, 2015

(54) INHIBITION OF WATER PENETRATION INTO BALLISTIC MATERIALS

(75) Inventors: Brian D. Arvidson, Chester, VA (US);
David A. Hurst, Richmond, VA (US);
Lori L. Wagner, Richmond, VA (US);
Ashok Bhatnagar, Richmond, VA (US);
Henry G. Ardiff, Chesterfield, VA (US)

(73) Assignee: Honeywell International Inc, Morristown, NJ (US)

( * ) Notice: Subject to any disclaimer, the term of this patent is extended or adjusted under 35 U.S.C. 154(b) by 1808 days.

(21) Appl. No.: 11/725,525

(22) Filed: Mar. 19, 2007

(65) Prior Publication Data

US 2013/0115839 A1   May 9, 2013

(51) Int. Cl.
| | |
|---|---|
| *B32B 27/12* | (2006.01) |
| *B64D 37/06* | (2006.01) |
| *F41H 5/08* | (2006.01) |
| *B29C 65/00* | (2006.01) |
| *B32B 27/08* | (2006.01) |
| *B32B 5/12* | (2006.01) |
| *B32B 5/26* | (2006.01) |
| *F41H 5/04* | (2006.01) |

(52) U.S. Cl.
CPC . *B32B 27/08* (2013.01); *B32B 5/12* (2013.01); *B32B 5/26* (2013.01); *B32B 27/12* (2013.01); *F41H 5/0478* (2013.01); *Y10S 428/911* (2013.01); *Y10S 428/912* (2013.01)
USPC ............. 442/135; 428/911; 428/912; 89/901; 89/939; 156/60

(58) Field of Classification Search
CPC ........... B32B 5/26; B32B 27/12; B64D 37/06
USPC ......................... 428/911–912; 442/134–135; 89/901–939
See application file for complete search history.

(56) References Cited

U.S. PATENT DOCUMENTS

| | | | | |
|---|---|---|---|---|
| 4,916,000 | A * | 4/1990 | Li et al. .................... | 428/105 |
| 5,935,678 | A | 8/1999 | Park ........................ | 428/105 |
| 6,266,819 | B1 * | 7/2001 | Bachner, Jr. .............. | 2/2.5 |
| 2004/0166755 | A1 | 8/2004 | Bergmans et al. .......... | 442/254 |
| 2004/0221712 | A1 * | 11/2004 | Stewart et al. ............ | 89/36.05 |
| 2008/0206525 | A1 | 8/2008 | Jacobs et al. | |

FOREIGN PATENT DOCUMENTS

| | | |
|---|---|---|
| JP | 2004530039 | 9/2004 |
| WO | 02/101319 | 12/2002 |
| WO | 2007003334 | 1/2007 |

OTHER PUBLICATIONS http://www.bayermaterialsciencenafta.com/products/index.cfm?mode=grades&pp_num=EB7C4BD9-0DCD-BBE0-A4B3F13F669BA736&o_num=13; Aug. 27, 2006.*
Bayhydrol 124 Technical Data Sheet, Aug. 27, 2006.*

* cited by examiner

*Primary Examiner* — Jeremy R. Pierce
*Assistant Examiner* — Ricardo E Lopez

(57) ABSTRACT

Ballistic resistant articles having excellent resistance to deterioration due to liquid exposure. More particularly, ballistic resistant fibrous composites and articles that retain their superior ballistic resistance performance after exposure to liquids such as sea water and organic solvents, such as gasoline and other petroleum-based products.

25 Claims, 1 Drawing Sheet

INHIBITION OF WATER PENETRATION INTO BALLISTIC MATERIALS

BACKGROUND OF THE INVENTION

1. Field of the Invention

This invention relates to ballistic resistant articles having excellent resistance to deterioration due to liquid exposure. More particularly, the invention pertains to ballistic resistant fabrics and articles that retain their superior ballistic resistance performance after exposure to liquids such as sea water and organic solvents, such as gasoline and other petroleum-based products.

2. Description of the Related Art

Ballistic resistant articles containing high strength fibers that have excellent properties against projectiles are well known. Articles such as bullet resistant vests, helmets, vehicle panels and structural members of military equipment are typically made from fabrics comprising high strength fibers. High strength fibers conventionally used include polyethylene fibers, aramid fibers such as poly(phenylenediamine terephthalamide), graphite fibers, nylon fibers, glass fibers and the like. For many applications, such as vests or parts of vests, the fibers may be used in a woven or knitted fabric. For other applications, the fibers may be encapsulated or embedded in a matrix material to form woven or non-woven rigid or flexible fabrics.

Various ballistic resistant constructions are known that are useful for the formation of hard or soft armor articles such as helmets, panels and vests. For example, U.S. Pat. Nos. 4,403,012, 4,457,985, 4,613,535, 4,623,574, 4,650,710, 4,737,402, 4,748,064, 5,552,208, 5,587,230, 6,642,159, 6,841,492, 6,846,758, all of which are incorporated herein by reference, describe ballistic resistant composites which include high strength fibers made from materials such as extended chain ultra-high molecular weight polyethylene. These composites display varying degrees of resistance to penetration by high speed impact from projectiles such as bullets, shells, shrapnel and the like.

For example, U.S. Pat. Nos. 4,623,574 and 4,748,064 disclose simple composite structures comprising high strength fibers embedded in an elastomeric matrix. U.S. Pat. No. 4,650,710 discloses a flexible article of manufacture comprising a plurality of flexible layers comprised of high strength, extended chain polyolefin (ECP) fibers. The fibers of the network are coated with a low modulus elastomeric material. U.S. Pat. Nos. 5,552,208 and 5,587,230 disclose an article and method for making an article comprising at least one network of high strength fibers and a matrix material that includes a vinyl ester and diallyl phthalate. U.S. Pat. No. 6,642,159 discloses an impact resistant rigid composite having a plurality of fibrous layers which comprise a network of filaments disposed in a matrix, with elastomeric layers there between. The composite is bonded to a hard plate to increase protection against armor piercing projectiles.

Hard or rigid body armor provides good ballistic resistance, but can be very stiff and bulky. Accordingly, body armor garments, such as ballistic resistant vests, are preferably formed from flexible or soft armor materials. However, while such flexible or soft materials exhibit excellent ballistic resistance properties, they also generally exhibit poor resistance to liquids, including fresh water, seawater and organic solvents, such as petroleum, gasoline, gun lube and other solvents derived from petroleum. This is problematic because the ballistic resistance performance of such materials is generally known to deteriorate when exposed to or submerged in liquids. Further, while it has been known to apply a protective film to a fabric surface to enhance fabric durability and abrasion resistance, as well as water or chemical resistance, these films add weight to the fabric. Accordingly, it would be desirable in the art to provide soft, flexible ballistic resistant materials that perform at acceptable ballistic resistance standards after being contacted with or submerged in a variety of liquids, and also have superior durability.

The present invention provides fibrous composite materials that offers the desired protection from liquids, as well as heat and cold resistance, and resistance to abrasion and wear, while maintaining good flexibility. Particularly, the invention provides ballistic resistant structures incorporating at least two fibrous layers that are surrounded on each of their surfaces by a polymer film, and wherein fibrous layers comprise fibers that are at least partially coated with a polymeric binder material that is resistant to dissolution by water and resistant to dissolution by one or more organic solvents. It has been discovered that this combination of polymer films with the fibrous layers contribute to the retention of the ballistic resistance properties of a fabric after prolonged exposure to potentially harmful liquids, eliminating the need for a protective surface film to achieve such benefits. It has also been unexpectedly found that the presence of polymer films on each fiber surface inhibits the wicking of liquids into the fabric at the fabric edges and prevents liquids from settling into spaces between fibers. Accordingly, the fabrics of the invention retain a low weight after being submerged in water or other liquids.

SUMMARY OF THE INVENTION

The invention provides a fibrous composite material, comprising in order:

a) a first outer polymer film;

b) a first fibrous layer in contact with the first outer polymer film; the first fibrous layer comprising a plurality of fibers wherein said fibers are at least partially coated with a polymeric binder material that is resistant to dissolution by water and resistant to dissolution by one or more organic solvents;

c) a central polymer film in contact with the first fibrous layer;

d) a second fibrous layer in contact with the central polymer film; the second fibrous layer comprising a plurality of fibers wherein said fibers are at least partially coated with a polymeric binder material that is resistant to dissolution by water and resistant to dissolution by one or more organic solvents; and e) a second outer polymer film in contact with the second fibrous layer.

The invention also provides a method of forming a fibrous composite material, comprising:

a) providing a first outer polymer film;

b) attaching a first fibrous layer to the first outer polymer film; the first fibrous layer comprising a plurality of fibers wherein said fibers are at least partially coated with a polymeric binder material that is resistant to dissolution by water and resistant to dissolution by one or more organic solvents;

c) attaching a central polymer film to the first fibrous layer;

d) attaching a second fibrous layer to the central polymer film; the second fibrous layer comprising a plurality of fibers wherein said fibers are at least partially coated with a polymeric binder material that is resistant to dissolution by water and resistant to dissolution by one or more organic solvents; and e) attaching a second outer polymer film to the second fibrous layer.

DETAILED DESCRIPTION OF THE INVENTION

The invention presents a fibrous composite material and articles that retain superior ballistic penetration resistance after exposure to water, particularly sea water, and organic solvents, particularly solvents derived from petroleum such as gasoline. The articles of the invention have superior ballistic penetration resistance against high energy ballistic threats, including bullets and high energy fragments, such as shrapnel.

Figure 1:
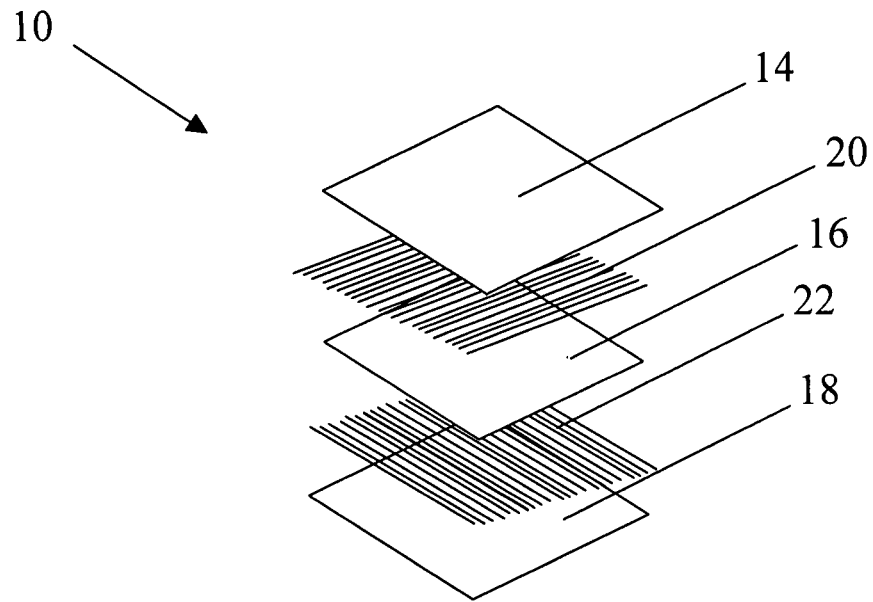
FIG. 1 is a schematic representation of a five-layer composite structure of the invention wherein each of the first and second fibrous layers are made up of a unidirectional non-woven parallel array.
Figure 2:
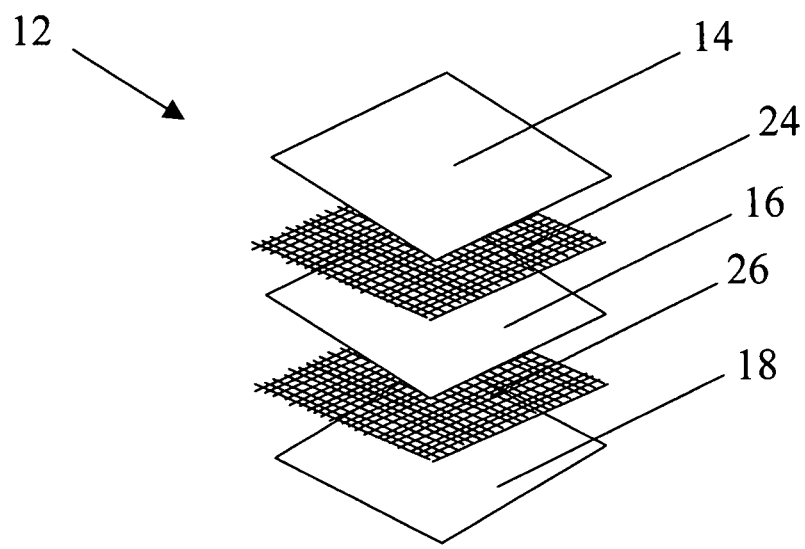
FIG. 2 is a schematic representation of a five-layer composite structure of the invention wherein each of the first and second fibrous layers are made up of multiple layers of overlapping non-woven fiber plies or alternatively woven fabrics.

The fibrous composite material of the invention is characterized by alternating polymer films and fibrous layers, where each adjacent layer of the material is different. FIGS. 1 and 2 schematically illustrate the preferred layering structures of the composites of the invention. As illustrated in FIGS. 1 and 2, the fibrous composite material of the invention preferably comprises one of two preferred structures. Each structure preferably includes at least five component layers. Additional alternating layers may be included, although five total layers is most preferred to maintain a low weight. As shown in FIG. 1, a fibrous composite material 10 is illustrated comprising, in order, a first outer polymer film 14, a first fibrous layer 20, a central polymer film 16, a second fibrous layer 22 and a second outer polymer film 18. As shown in FIG. 2, a fibrous composite material 12 is illustrated comprising, in order, a first outer polymer film 14, a first fibrous layer 24, a central polymer film 16, a second fibrous layer 26 and a second outer polymer film 18.

Each embodiment includes multiple polymer films and multiple fibrous layers. The two embodiments differ primarily in the structure of the fibrous layers. In the first embodiment of the invention, illustrated in FIG. 1, first fibrous layer 20 and second fibrous layer 22 each comprise a single ply of non-woven, preferably non-overlapping fibers that are aligned in a unidirectional, substantially parallel array. This type of fibrous layer is known in the art as a "unitape" (or "unidirectional tape") and is also referred to herein as a "single ply". As illustrated in the figure, the parallel fibers of said first fibrous layer 20 are preferably positioned orthogonally to the parallel fibers of said second fibrous layer 22, relative to the longitudinal fiber direction of each fiber ply, such that the fibers of each fibrous layer are cross-plied at 0°/90° with respect to each other. As is conventionally known in the art, excellent ballistic resistance is achieved when individual fiber layers are cross-plied such that the fiber alignment direction of one layer is rotated at an angle with respect to the fiber alignment direction of another layer. Adjacent layers can be aligned at virtually any angle between about 0° and about 90° with respect to the longitudinal fiber direction of another layer. Most preferably, the fibers of fibrous layer 20 and fibrous layer 22 are cross-plied orthogonally at 0° and 90° angles.

In accordance with the invention, each single ply fibrous layer of this first embodiment comprises fibers that are at least partially coated with a polymeric binder material that is resistant to dissolution by water and resistant to dissolution by one or more organic solvents. This polymeric binder material assists in the merging of layers 14, 16, 18, 24 and 26, as well as in providing a stable composite material having good resistance to degradation due to environmental contaminants.

In the second embodiment of the invention, first fibrous layer 24 and second fibrous layer 26 each preferably comprise a plurality of overlapping non-woven fiber plies that are consolidated into a single-layer, monolithic element, wherein each ply comprises fibers aligned in a unidirectional, substantially parallel array and wherein each ply of a fibrous layer is positioned orthogonally to the parallel fibers of each adjacent ply within that fibrous layer relative to the longitudinal fiber direction of each fiber ply (unitape). Each of fibrous layers 24 and 26 also comprise fibers that are at least partially coated with a polymeric binder material that is resistant to dissolution by water and resistant to dissolution by one or more organic solvents. Most preferably fibrous layers 24 and 26 include only two consolidated "unitapes" cross-plied at 0°/90°, but additional unitapes may be incorporated within the consolidated single-layer element, and adjacent plies may also be cross-plied at angles other than 0° and 90°. Any additional layers are also preferably cross-plied at an angle relative to the longitudinal fiber direction of adjacent fiber plies. For example, a five layer non-woven structure may have plies at a 0°/45°/90°/45°/0° orientation or at other angles. Such rotated unidirectional alignments are described, for example, in U.S. Pat. Nos. 4,457,985; 4,748,064; 4,916,000; 4,403,012; 4,623,573; and 4,737,402. Most typically, fibrous layers 24 and 26, when comprising non-woven fiber plies, will include from 1 to about 6 plies, but may include as many as about 10 to about 20 plies as may be desired for various applications. Such non-woven fibrous layers may be constructed using well known methods, such as by the methods described in U.S. Pat. No. 6,642,159.

The greater the number of plies translates into greater ballistic resistance, but also greater weight. The number of fiber plies forming a fibrous layer 24 or 26, or forming a composite structure 10 where additional single-ply fibrous layers attached, varies depending upon the ultimate use of the desired ballistic resistant article. For example, in body armor vests for military applications, in order to form an article composite that achieves a desired 1.0 pound per square foot areal density (4.9 kg/m$^2$), a total of at 22 individual plies may be required, wherein the plies may be woven, knitted, felted or non-woven fabrics formed from the high-strength fibers described herein. In another embodiment, body armor vests for law enforcement use may have a number of layers based on the National Institute of Justice (NIJ) Threat Level. For example, for an NIJ Threat Level IIIA vest, there may also be a total of 22 layers. For a lower NIJ Threat Level, fewer layers may be employed.

Fibrous layers 24 and 26 may alternately comprise woven fibrous layers. Woven fibrous layers may be formed using techniques that are well known in the art using any fabric weave, such as plain weave, crowfoot weave, basket weave, satin weave, twill weave and the like. Plain weave is most common, where fibers are woven together in a 0°/90° orientation. In another embodiment, a hybrid structure may be assembled where one fibrous layer comprises a woven fibrous layer and another fibrous layer comprises a non-woven fibrous layer. Alternately, fibrous layers 24 and 26 may also comprise a consolidated combination of woven and non-woven fiber plies.

For the purposes of the present invention, a "fiber" is an elongate body the length dimension of which is much greater than the transverse dimensions of width and thickness. The cross-sections of fibers for use in this invention may vary widely. They may be circular, flat or oblong in cross-section. Accordingly, the term fiber includes filaments, ribbons, strips and the like having regular or irregular cross-section. They may also be of irregular or regular multi-lobal cross-section having one or more regular or irregular lobes projecting from the linear or longitudinal axis of the fibers. It is preferred that the fibers are single lobed and have a substantially circular cross-section.

As used herein, an "array" describes an orderly arrangement of fibers or yarns, and a "parallel array" describes an orderly parallel arrangement of fibers or yarns. A fiber "layer" describes a planar arrangement of woven or non-woven fibers or yarns. As used herein, a "single-layer" structure refers to monolithic structure composed of one or more individual fiber layers that have been consolidated into a single unitary structure. In general, a "fabric" may relate to either a woven or non-woven material. The fibrous plies of the invention may alternately comprise yarns rather than fibers, where a "yarn" is a strand consisting of multiple filaments. Non-woven fibrous plies may also comprise felted structures which are formed using conventionally known techniques, comprising fibers in random orientation.

In accordance with the invention, the fibers comprising each of fibrous layers 20, 22, 24 and 26 preferably comprise high-strength, high tensile modulus fibers. As used herein, a "high-strength, high tensile modulus fiber" is one which has a preferred tenacity of at least about 7 g/denier or more, a preferred tensile modulus of at least about 150 g/denier or more, and preferably an energy-to-break of at least about 8 J/g or more, each both as measured by ASTM D2256. As used herein, the term "denier" refers to the unit of linear density, equal to the mass in grams per 9000 meters of fiber or yarn. As used herein, the term "tenacity" refers to the tensile stress expressed as force (grams) per unit linear density (denier) of an unstressed specimen. The "initial modulus" of a fiber is the property of a material representative of its resistance to deformation. The term "tensile modulus" refers to the ratio of the change in tenacity, expressed in grams-force per denier (g/d) to the change in strain, expressed as a fraction of the original fiber length (in/in).

Particularly suitable high-strength, high tensile modulus fiber materials include polyolefin fibers, particularly extended chain polyolefin fibers, such as highly oriented, high molecular weight polyethylene fibers, particularly ultra-high molecular weight polyethylene fibers and ultra-high molecular weight polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzazole fibers, such as polybenzoxazole (PBO) and polybenzothiazole (PBT) fibers, and liquid crystal copolyester fibers. Each of these fiber types is conventionally known in the art.

In the case of polyethylene, preferred fibers are extended chain polyethylenes having molecular weights of at least 500,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,551,296 and 5,006,390, which are also incorporated herein by reference. A particularly preferred fiber type for use in the invention are polyethylene fibers sold under the trademark SPECTRA® from Honeywell International Inc. SPECTRA® fibers are well known in the art and are described, for example, in U.S. Pat. Nos. 4,623,547 and 4,748,064.

Also particularly preferred are aramid (aromatic polyamide) or para-aramid fibers. Such are commercially available and are described, for example, in U.S. Pat. No. 3,671,542. For example, useful poly(p-phenylene terephthalamide) filaments are produced commercially by Dupont corporation under the trade name of KEVLAR®. Also useful in the practice of this invention are poly(m-phenylene isophthalamide) fibers produced commercially by Dupont under the trade name NOMEX® and fibers produced commercially by Teijin under the trade name TWARON®.

Suitable polybenzazole fibers for the practice of this invention are commercially available and are disclosed for example in U.S. Pat. Nos. 5,286,833, 5,296,185, 5,356,584, 5,534,205 and 6,040,050, each of which are incorporated herein by reference. Preferred polybenzazole fibers are ZYLON® brand fibers from Toyobo Co. Suitable liquid crystal copolyester fibers for the practice of this invention are commercially available and are disclosed, for example, in U.S. Pat. Nos. 3,975,487; 4,118,372 and 4,161,470, each of which is incorporated herein by reference.

Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and widely commercially available.

The other suitable fiber types for use in the present invention include glass fibers, fibers formed from carbon, fibers formed from basalt or other minerals, rigid rod fibers such as M5® fibers, and combinations of all the above materials, all of which are commercially available. For example, the fibrous layers may be formed from a combination of SPECTRA® fibers and Kevlar® fibers. M5® fibers are formed from pyridobisimidazole-2,6-diyl(2,5-dihydroxy-p-phenylene) and are available from Magellan Systems International of Richmond, Va. and are described, for example, in U.S. Pat. Nos. 5,674,969, 5,939,553, 5,945,537, and 6,040,478, each of which is incorporated herein by reference. Specifically preferred fibers include M5® fibers, polyethylene SPECTRA® fibers, and aramid Kevlar® fibers. The fibers may be of any suitable denier, such as, for example, 50 to about 3000 denier, more preferably from about 200 to 3000 denier, still more preferably from about 650 to about 2000 denier, and most preferably from about 800 to about 1500 denier.

The most preferred fibers for the purposes of the invention are either high-strength, high tensile modulus extended chain polyethylene fibers or high-strength, high tensile modulus para-aramid fibers. As stated above, a high-strength, high tensile modulus fiber is one which has a preferred tenacity of about 7 g/denier or more, a preferred tensile modulus of about 150 g/denier or more and a preferred energy-to-break of about 8 J/g or more, each as measured by ASTM D2256. In the preferred embodiment of the invention, the tenacity of the fibers should be about 15 g/denier or more, preferably about 20 g/denier or more, more preferably about 25 g/denier or more and most preferably about 30 g/denier or more. The fibers of the invention also have a preferred tensile modulus of about 300 g/denier or more, more preferably about 400 g/denier or more, more preferably about 500 g/denier or more, more preferably about 1,000 g/denier or more and most preferably about 1,500 g/denier or more. The fibers of the invention also have a preferred energy-to-break of about 15 J/g or more, more preferably about 25 J/g or more, more preferably about 30 J/g or more and most preferably have an energy-to-break of about 40 J/g or more.

These combined high strength properties are obtainable by employing well known processes. U.S. Pat. Nos. 4,413,110, 4,440,711, 4,535,027, 4,457,985, 4,623,547 4,650,710 and 4,748,064 generally discuss the formation of preferred high strength, extended chain polyethylene fibers employed in the present invention. Such methods, including solution grown or gel fiber processes, are well known in the art. Methods of forming each of the other preferred fiber types, including para-aramid fibers, are also conventionally known in the art, and the fibers are commercially available.

As stated above, each of fibrous layers 20, 22, 24 and 26 further comprise a polymeric binder material, which is also commonly referred to in the art as a polymeric matrix material. The polymeric matrix material includes one or more components and facilitates the consolidation, or merging together, of multiple fiber plies (i.e. multiple unitapes) when subjected to heat and/or pressure, thereby forming a consolidated, unitary, single-layer element. For each of fibrous layers 20, 22, 24 and 26, polymeric binder material coated on their component fibers comprises a material that is resistant to dissolution by water and resistant to dissolution by one or more organic solvents is optional. The surfaces of each of the fibers forming said fibrous layers are at least partially coated with a polymeric matrix material, and are preferably substantially coated to by the matrix material. Coating the fibers of woven fibrous layers or fabrics with the polymeric matrix material may be conducted either before or after weaving. Said fibrous layers may alternately comprise a plurality of yarn plies that are coated with a matrix material and consolidated, or felted structures comprising fibers in a random orientation embedded in a suitable matrix material that are matted and compressed together.

The fibrous layers of the invention may be prepared using a variety of matrix materials, including both low modulus, elastomeric matrix materials and high modulus, rigid matrix materials. Useful polymeric matrix materials include both low modulus, thermoplastic matrix materials and high modulus, thermosetting matrix materials having the above desired properties, or a combination thereof. Suitable thermoplastic matrix materials preferably have an initial tensile modulus of less than about 6,000 psi (41.3 MPa), and suitable high modulus, thermosetting materials preferably have an initial tensile modulus of at least about 300,000 psi (2068 MPa), each as measured at 37° C. by ASTM D638. As used herein throughout, the term tensile modulus means the modulus of elasticity as measured by ASTM D638 for a matrix material. For the manufacture of soft body armor, low modulus thermoplastic matrix materials are most preferred. Preferred low modulus thermoplastic materials have a tensile modulus of about 4,000 psi (27.6 MPa) or less, more preferably about 2400 psi (16.5 MPa) or less, more preferably 1200 psi (8.23 MPa) or less, and most preferably is about 500 psi (3.45 MPa) or less.

As described herein, the polymeric matrix material is independently resistant to dissolution by, particularly sea water, and independently resistant to dissolution by one or more organic solvents, such as diesel or non-diesel gasoline, gun lube, petroleum and organic solvents derived from petroleum. The polymeric matrix material is also preferably resistant to dissolution by a combination of water and one or more organic solvents. Conventionally, there are two types of polymers which are predominantly used in the manufacture of soft body armor, i.e. solvent-based and water-based synthetic rubbers; and polyurethane (typically water-based). Such synthetic rubbers are generally block copolymers of styrene and isoprene, particularly styrene-isoprene-styrene (SIS) copolymers. These SIS copolymers are processed in both solvent-based solutions and water-based dispersions. Solvent-based synthetic rubbers are generally sensitive to petroleum solvents and will dissolve upon exposure. Such solvent-based synthetic rubbers are generally unaffected by water. However, water-based dispersions can be very sensitive to water and sea water, depending on the method and materials of dispersion. Currently employed polyurethane matrix polymers, due to their inherent polarity, are generally resistant to petroleum solvents, with some exceptions. Water-based polyurethanes can be degraded by water, particularly sea water, which can cause a hydrolytic breakdown of the polyurethane chain, resulting in a reduction in both molecular weight and physical properties.

It has been found that polymers which are both polar and hydrolytically stable achieve the desired balance of water resistance and organic solvent resistance, while maintaining the desired ballistic resistance properties necessary for an effective ballistic resistant article. Polar polymers are generally resistant to dissolution by non-polar organic solvents, and hydrolytically stable polymers are stable to hydrolysis by water, i.e. resistant to chemical decomposition when exposed to water. Accordingly, ballistic resistant articles formed incorporating such polymeric matrix materials retain their ballistic resistance properties after prolonged exposure to such liquids.

In the preferred embodiments of the invention, suitable polymeric matrix materials preferably include synthetic rubbers, diene rubbers and styrenic block copolymers including styrene-isoprene-styrene (SIS) and styrene-butadiene-styrene (SBS), polar vinyl-based polymers, polar acrylic polymers, polyvinyl chloride homopolymer, polyvinyl chloride copolymer, polyvinyl chloride terpolymer, polyvinyl butyral, polyvinylidene chloride, polyvinylidene fluoride polar ethylene vinyl acetate copolymers, polar ethylene acrylic acid copolymers, silicone, thermoplastic polyurethanes, nitrile rubber, polychloroprenes such as Neoprene (manufactured by DuPont), polycarbonates, polyketones, polyamides, cellulosics, polyimides, polyesters, epoxies, alkyds, phenolics, polyacrylonitrile, polyether sulfones and combinations thereof.

Also suitable are other polar, hydrolytically stable polymers not specified herein. Non-polar synthetic rubbers and styrenic block copolymers, such as SIS and SBS, generally should be modified with polar groups, such as by the grafting of carboxyl groups or adding acid or alcohol functionality, or any other polar group, to be sufficiently oil repellant. For example, non-polar polymers may be copolymerized with monomers containing carboxylic acid groups such as acrylic acid or maleic acid, or another polar group such as amino, nitro or sulfonate groups. Such techniques are well known in the art.

Particularly preferred are polar polymers which have a C—C polymer backbone. As stated herein, polar polymers are generally resistant to dissolution by non-polar organic solvents. Polymers having a C—C— backbone, such as vinyl-based polymers including, for example, acrylics, ethylene vinyl acetate, polyvinylidene chloride, etc., have a hydrolytically stable molecular structure. Also particularly preferred are polar, thermoplastic polyurethanes, particularly those that have been formulated to enhance hydrolytic stability. Unlike C—C linkages, urethane linkages and ester linkages are generally susceptible hydrolytic degradation. Accordingly, polymers having such linkages generally are formulated or modified to enhance water repellency and hydrolytic stability. For example, polyurethanes may be formulated to enhance hydrolytic stability through copolymerization with polyether polyol or aliphatic polyol components, or other components known to enhance hydrolytic stability. The main polyurethane producing reaction is between an aliphatic or aromatic diisocyanate and a polyol, typically a polyethylene glycol or polyester polyol, in the presence of catalysts. Selection of the isocyanate co-reactant can also influence the hydrolytic stability. Bulky pendant groups on either or both of the co-reactants can also protect the urethane linkage from attack. Polyurethane can be made in a variety of densities and hardnesses by varying the type of monomers used and by adding other substances to modify their characteristics or enhance their hydrolytic stability, such as with water repellants, pH buffers, cross-linking agents and chelating agents, etc. The most preferred polyurethane matrix material comprises a polar, hydrolytically stable, polyether- or aliphatic-based thermoplastic polyurethane, which are preferred over polyester-based polyurethanes.

The thermoplastic polyurethane may be a homopolymer, a copolymer, or a blend of a polyurethane homopolymer and a polyurethane copolymer. Such polymers are commercially available. Such polyurethanes are generally available as aqueous solutions, dispersions or emulsions, in which the solids component may range from about 20% to 80% by weight, more preferably from about 40% to about 60% by weight, with the remaining weight being water. An aqueous system is preferred for ease of use. Preferred polyurethane coated fibrous layers are described in U.S. patent application Ser. No. 11/213,253, which is incorporated herein by reference in its entirety.

The glass transition temperature (Tg) of the preferred thermoplastic matrix materials is preferably less than about 0° C., more preferably the less than about −40° C., and most preferably less than about −50° C. Preferred thermoplastic materials also have a preferred elongation to break of at least about 50%, more preferably at least about 100% and most preferably an elongation to break of at least about 300%.

With regard to the woven fibrous layers, it is generally not necessary for the fibers to be coated with the polymeric matrix material, because no consolidation is conducted. However, it is preferred that the fibers comprising the woven fibrous layers be coated with a polymeric matrix material that is resistant to dissolution by water, and resistant to dissolution by one or more organic solvents, to achieve the benefits described herein.

The rigidity, impact and ballistic properties of the articles formed from the fabric composites of the invention are effected by the tensile modulus of the matrix polymer. For example, U.S. Pat. No. 4,623,574 discloses that fiber reinforced composites constructed with elastomeric matrices having tensile moduli less than about 6000 psi (41,300 kPa) have superior ballistic properties compared both to composites constructed with higher modulus polymers, and also compared to the same fiber structure without a matrix. However, low tensile modulus matrix polymers also yield lower rigidity composites. Further, in certain applications, particularly those where a composite must function in both antiballistic and structural modes, there is needed a superior combination of ballistic resistance and rigidity. Accordingly, the most appropriate type of matrix polymer to be used will vary depending on the type of article to be formed from the fabrics of the invention. In order to achieve a compromise in both properties, a suitable matrix material may combine both low modulus and high modulus materials to form a single matrix material. The matrix material may also include fillers such as carbon black or silica, may be extended with oils, or may be vulcanized by sulfur, peroxide, metal oxide or radiation cure systems as is well known in the art.

The application of the matrix is conducted prior to consolidating the fiber plies. The matrix may be applied to a fiber in a variety of ways, and the term "coated" is not intended to limit the method by which the matrix material is applied onto the fiber surface or surfaces. For instance, the polymeric matrix material may be applied in solution form by spraying or roll coating a solution of the matrix material onto fiber surfaces, wherein a portion of the solution comprises the desired polymer or polymers and a portion of the solution comprises a solvent capable of dissolving the polymer or polymers, followed by drying.

Another method is to apply a neat polymer of the coating material to fibers either as a liquid, a sticky solid or particles in suspension or as a fluidized bed. Alternatively, the coating may be applied as a solution or emulsion in a suitable solvent which does not adversely affect the properties of the fiber at the temperature of application. For example, the fiber can be transported through a solution of the matrix material to substantially coat the fiber and then dried to form a coated fiber. The resulting coated fiber can then be arranged into the desired fibrous layer configuration. In another coating technique, a layer of fibers may first be arranged, followed by dipping the layer into a bath of a solution containing the matrix material dissolved in a suitable solvent, such that each individual fiber is substantially coated with the matrix material, and then dried through evaporation of the solvent. The dipping procedure may be repeated several times as required to place a desired amount of matrix material coating on the fibers, preferably encapsulating each of the individual fibers or covering 100% of the fiber surface area with the matrix material.

While any liquid capable of dissolving or dispersing a polymer may be used, preferred groups of solvents include water, paraffin oils and aromatic solvents or hydrocarbon solvents, with illustrative specific solvents including paraffin oil, xylene, toluene, octane, cyclohexane, methyl ethyl ketone (MEK) and acetone. The techniques used to dissolve or disperse the coating polymers in the solvents will be those conventionally used for the coating of similar materials on a variety of substrates.

Other techniques for applying the coating to the fibers may be used, including coating of the high modulus precursor (gel fiber) before the fibers are subjected to a high temperature stretching operation, either before or after removal of the solvent from the fiber (if using the gel-spinning fiber forming technique). The fiber may then be stretched at elevated temperatures to produce the coated fibers. The gel fiber may be passed through a solution of the appropriate coating polymer under conditions to attain the desired coating. Crystallization of the high molecular weight polymer in the gel fiber may or may not have taken place before the fiber passes into the solution. Alternatively, the fiber may be extruded into a fluidized bed of an appropriate polymeric powder. Furthermore, if a stretching operation or other manipulative process, e.g. solvent exchanging, drying or the like is conducted, the coating may be applied to a precursor material of the final fiber. In the most preferred embodiment of the invention, the fibers of the invention are first coated with the matrix material, followed by arranging a plurality of fibers into either a woven or non-woven fiber layer. Such techniques are well known in the art.

Accordingly, the fibers of the invention may be coated on, impregnated with, embedded in, or otherwise applied with a matrix material by applying the matrix material to the fibers and then consolidating the matrix material-fibers combination to form a composite. As stated above, by "consolidating" it is meant that the matrix material and each individual fiber layer are combined into a single unitary layer. Consolidation can occur via drying, cooling, heating, pressure or a combination thereof. The term "composite" refers to consolidated combinations of fibers with the matrix material. As discussed previously, the term "matrix" as used herein is well known in the art, and is used to represent a binder material, such as a polymeric binder material, that binds the fibers together after consolidation.

As illustrated in FIGS. 1 and 2, polymer films 14, 16 and 18 are attached to each surface of fibrous layers 20, 22, 24 and 26. As illustrated in FIG. 2, the polymer films 14, 16 and 18 are preferably attached to said fibrous layers after any applicable consolidation steps. Suitable polymers for said polymer films non-exclusively include thermoplastic and thermosetting polymers. Suitable thermoplastic polymers non-exclusively may be selected from the group consisting of polyolefins, polyamides, polyesters, polyurethanes, vinyl polymers, fluoropolymers and co-polymers and mixtures thereof. Of these, polyolefin layers are preferred. The preferred polyolefin is a polyethylene. Non-limiting examples of polyethylene films are low density polyethylene (LDPE), linear low density polyethylene (LLDPE), linear medium density polyethylene (LMDPE), linear very-low density polyethylene (VLDPE), linear ultra-low density polyethylene (ULDPE), high density polyethylene (HDPE). Of these, the most preferred polyethylene is LLDPE. Suitable thermosetting polymers non-exclusively include thermoset allyls, aminos, cyanates, epoxies, phenolics, unsaturated polyesters, bismaleimides, rigid polyurethanes, silicones, vinyl esters and their copolymers and blends, such as those described in U.S. Pat. Nos. 6,846,758, 6,841,492 and 6,642,159. In each embodiment, polymer films 14, 16 and 18 may be the same or different.

Polymer films 14, 16 and 18 are preferably extruded layers that are cooled and attached to the fibrous layers by lamination using well known lamination techniques. Typically, laminating is done by positioning the individual layers on one another under conditions of sufficient heat and pressure to cause the layers to combine. The individual layers are positioned on one another, and the combination is then typically passed through the nip of a pair of heated laminating rollers by techniques well known in the art. Lamination heating may be done at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. In the embodiment of the invention where first fibrous layer 20 and second fibrous layer 22 each consist of only a single ply of fibers, the attachment of the polymer films to the fibrous layers 20 and 22 and the attachment of the fibrous layers 20 and 22 to each other are preferably done in a single lamination-consolidation step. Alternatively, the polymer films can be attached to the fibers in the coating step where the binder resin is either applied to the fibers and then laid onto the film, or applied to the film and the fibers laid into the resin on a substrate and allowed to dry while in contact with one another. In the embodiment of the invention where first fibrous layer 24 and second fibrous layer 26 comprise a plurality of non-woven fiber plies, it is preferable that said fibrous layers are consolidated prior to lamination of the polymer films 14, 16 and 18.

Suitable consolidation conditions for consolidating fiber plies into a fibrous layer 24 and/or 26 are similar to said lamination conditions. In a typical consolidation process, the cross-plied fiber plies are pressed together at a temperature of from about 200° F. (~93° C.) to about 350° F. (~177° C.), more preferably at a temperature of from about 200° F. to about 300° F. (~149° C.) and most preferably at a temperature of from about 200° F. to about 250° F. (~121° C.), and at a pressure of from about 25 psi (~172 kPa) to about 500 psi (3447 kPa) or higher, for a duration of about 30 seconds to about 24 hours. Such methods are conventionally known in the art. When heating, it is possible that the matrix can be caused to stick or flow without completely melting. However, generally, if the matrix material is caused to melt, relatively little pressure is required to form the composite, while if the matrix material is only heated to a sticking point, more pressure is typically required. The consolidation step may generally take from about 10 seconds to about 24 hours. Similar to molding, suitable consolidation temperatures, pressures and times are generally dependent on the type of polymer, polymer content, process used and type of fiber. The consolidation may alternately be conducted in an autoclave, as is conventionally known in the art. The consolidation of the fiber plies into a fibrous layer 24 and/or 26 and the attachment of the polymer films may also be done in a single consolidation step.

Structures 10 and 12 of the invention may also be formed by combining the multiple component layers of each structure by molding under heat and pressure in a suitable molding apparatus. Generally, molding is conducted at a pressure of from about 50 psi (344.7 kPa) to about 5000 psi (34474 kPa), more preferably about 100 psi (689.5 kPa) to about 1500 psi (10342 kPa), most preferably from about 150 psi (1034 kPa) to about 1000 psi (6895 kPa). Higher pressures of from about 500 psi (3447 kPa) to about 5000 psi, more preferably from about 750 psi (5171 kPa) to about 5000 psi and more preferably from about 1000 psi to about 5000 psi may also be utilized. The molding step may take from about 4 seconds to about 45 minutes. Preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~138° C.). Suitable molding temperatures, pressures and times will generally vary depending on the type of polymer matrix type, polymer matrix content, number of layers, mass of material and type of fiber. While each of the molding and consolidation techniques described herein are similar, each process is different. Particularly, molding is a batch process and consolidation is a continuous process. Further, molding typically involves the use of a mold, such as a shaped mold or a match-die mold. The pressure under which the fabrics of the invention are molded has a direct effect on the stiffness of the resulting molded product. Particularly, the higher the pressure at which the composites are molded, the higher the stiffness, and vice-versa. In addition to the molding pressure, the quantity, thickness and composition of the fabric layers, matrix type and polymer film type also directly affects the stiffness of the articles formed from the inventive composites.

The composite structures 10 and 12 of the invention may optionally be calendared under heat and pressure to smooth or polish their surfaces. Calendaring methods are well known in the art and may be conducted prior to or after molding.

In the preferred embodiment of the invention, the polymer film layers preferably comprise from about 2% to about 20% by weight of the overall fibrous composite material (which includes the weight, of the fibers, the optional polymeric matrix material, and the polymer films), more preferably from about 2% to about 15% by weight and most preferably from about 2% to about 10% by weight of the overall fibrous composite material. The percent by weight of the polymer film layers will generally vary depending on the number of fabric layers forming the multilayered film. If present, the proportion of the matrix material making up a fibrous layer preferably comprises from about 3% to about 30% by weight of the layer, more preferably from about 3% to about 20% by weight of the layer, more preferably from about 3% to about 16%, more preferably from about 5% to about 15% and more preferably from about 11% to about 15% by weight of the layer. The proportion of fibers making up each fibrous layer of the invention preferably comprises from about 60% to about 98% by weight of the layer, more preferably from about 70% to about 95% by weight of the layer, and most preferably from about 80% to about 90% by weight of the layer.

The thickness of the individual fibrous layers will correspond to the thickness of the individual fibers and to the number of plies forming a fibrous layer. Accordingly, a preferred single-ply non-woven fibrous ply will have a preferred thickness of from about 5 µm to about 3000 µm, more preferably from about 15 µm to about 300 µm and most preferably from about 25 µm to about 125 µm. A preferred single-layer, multi-ply, consolidated non-woven fibrous layer will have a preferred thickness of from about 12 µm to about 3000 µm, more preferably from about 15 µm to about 385 µm and most preferably from about 25 µm to about 255 µm. A preferred woven fibrous layer will have a preferred thickness of from about 25 µm to about 500 µm, more preferably from about 75 µm to about 385 µm and most preferably from about 125 µm to about 255 µm. The polymer films are preferably very thin, having preferred thicknesses of from about 1 µm to about 250 µm, more preferably from about 5 µm to about 25 µm and most preferably from about 5 µm to about 9 µm. Structures 10 and 12 each have a preferred total thickness of about 5 µm to about 1000 µm, more preferably from about 6 µm to about 750 µm and most preferably from about 7 µm to about 500 µm. While such thicknesses are preferred, it is to be understood that other film thicknesses may be produced to satisfy a particular need and yet fall within the scope of the present invention. The articles of the invention further have a preferred areal density of from about 0.25 lb/ft$^2$ (psf) (1.22 kg/m$^2$ (ksm)) to about 5.0 psf (24.41 ksm), more preferably from about 0.5 psf (2.44 ksm) to about 2.0 psf (9.76 ksm), more preferably from about 0.7 psf (3.41 ksm) to about 1.5 psf (7.32 ksm), and most preferably from about 0.75 psf (3.66 ksm) to about 1.25 psf (6.1 ksm).

The structures of the invention may be used in various applications to form a variety of different ballistic resistant articles using well known techniques. For example, suitable techniques for forming ballistic resistant articles are described in, for example, U.S. Pat. Nos. 4,623,574, 4,650, 710, 4,748,064, 5,552,208, 5,587,230, 6,642,159, 6,841,492 and 6,846,758.

The structures are particularly useful for the formation of flexible, soft armor articles, including garments such as vests, pants, hats, or other articles of clothing, and covers or blankets, used by military personnel to defeat a number of ballistic threats, such as 9 mm full metal jacket (FMJ) bullets and a variety of fragments generated due to explosion of hand-grenades, artillery shells, Improvised Explosive Devices (IED) and other such devises encountered in a military and peace keeping missions. As used herein, "soft" or "flexible" armor is armor that does not retain its shape when subjected to a significant amount of stress and is incapable of being freestanding without collapsing. The structures are also useful for the formation of rigid, hard armor articles. By "hard" armor is meant an article, such as helmets, panels for military vehicles, or protective shields, which have sufficient mechanical strength so that it maintains structural rigidity when subjected to a significant amount of stress and is capable of being freestanding without collapsing. The structures can be cut into a plurality of discrete sheets and stacked for formation into an article or they can be formed into a precursor which is subsequently used to form an article. Such techniques are well known in the art.

Garments of the invention may be formed through methods conventionally known in the art. Preferably, a garment may be formed by adjoining the ballistic resistant articles of the invention with an article of clothing. For example, a vest may comprise a generic fabric vest that is adjoined with the ballistic resistant structures of the invention, whereby the inventive structures are inserted into strategically placed pockets. This allows for the maximization of ballistic protection, while minimizing the weight of the vest. As used herein, the terms "adjoining" or "adjoined" are intended to include attaching, such as by sewing or adhering and the like, as well as un-attached coupling or juxtaposition with another fabric, such that the ballistic resistant articles may optionally be easily removable from the vest or other article of clothing. Articles used in forming flexible structures like flexible sheets, vests and other garments are preferably formed from using a low tensile modulus matrix material. Hard articles like helmets and armor are preferably formed using a high tensile modulus matrix material.

The ballistic resistance properties are determined using standard testing procedures that are well known in the art. Particularly, the protective power or penetration resistance of a structure is normally expressed by citing the impacting velocity at which 50% of the projectiles penetrate the composite while 50% are stopped by the shield, also known as the $V_{50}$ ballistic limit value. As used herein, the "penetration resistance" of an article is the resistance to penetration by a designated threat, such as physical objects including bullets, fragments, shrapnel and the like, and non-physical objects, such as a blast from explosion. For composites of equal areal density, which is the weight of the composite divided by the surface area, the higher the $V_{50}$, the better the resistance of the composite. The ballistic resistant properties of the articles of the invention will vary depending on many factors, particularly the type of fibers used to manufacture the fabrics. However, the use of a polymeric matrix material that is resistant to dissolution by water, and resistant to dissolution by one or more organic solvents does not negatively affect the ballistic properties of the articles of the invention. The flexible ballistic armor, weighing at least about 0.75 psf, formed herein have a $V_{50}$ of at-least 1450 fps (442 mps) when impacted with 17 grain Fragment Simulating Projectile (FSP) projectile or 9 mm Full Metal Jacket (FMJ) hand gun bullet. The flexible ballistic armor of this invention is also preferably characterized in retaining at least about 85%, more preferably at least 90% of $V_{50}$ performance after immersion in tap water or sea water when impacted with a 17 grain FSP or 9 mm FMJ hand gun bullet. Under these conditions, the flexible ballistic armor also exhibits a weight increase of preferably not more than 50%, and more preferably not more than about 40% from its dry weight. Moreover, the flexible ballistic armor of this invention preferably is characterized in retaining at least about 85%, more preferably at least about 90%, of its $V_{50}$ performance after immersion in gasoline at 70° F.±5° F. (21°

C.±2.8° C.) for 4 hours, when impacted with a 9 mm FMJ bullet or a 17 grain FSP.

The following examples serve to illustrate the invention:

EXAMPLE 1

Comparative

A ballistic shoot pack including 27 fabric layers was prepared for testing of fragment resistance. Prior to forming the shoot pack, the fabric layers were cut from a continuous laminated sheet of material that comprised two consolidated plies of unidirectional, high modulus polyethylene (HMPE) fibers impregnated with a polymeric binder material comprising Kraton® D1107 thermoplastic binder resin. The HMPE fibers were SPECTRA® 1300 manufactured by Honeywell International Inc. and had a tenacity of 35 g/denier, a tensile modulus of 1150 g/denier and an elongation at break of 3.4% The Kraton® D1107 resin is a polystyrene-polyisoprene-polystrene-block copolymer comprising 14% by weight styrene and is commercially available from Kraton Polymers of Houston, Tex. Each fabric layer comprised 79.5% by weight of fiber based on the weight the fibers plus the weight of the binder resin, and comprised 20.5% by weight of binder resin based on the weight of the fibers plus the weight of the binder resin.

The two fiber plies of each layer were cross-plied such that the fibers of one ply were oriented at a right angle to the fibers of the second ply relative to the longitudinal fiber direction of each fiber ply (conventional 0°/90° configuration). The plies were laminated between two linear low density polyethylene (LLDPE) films, each having a thickness of 9 μm and an areal density of 16 gram/m² (gsm). This construction is also known in the art as SPECTRA SHIELD® LCR, commercially available from Honeywell International, Inc. The lamination process included pressing the LLDPE films onto the cross-plied material at 110° C., under 200 psi (1379 kPa) pressure for 30 minutes, thereby forming a continuous laminated sheet of material having a thickness of 0.06" (1.524 mm). The sheet was cut to form 27 separate layers, each having a length and width of 18"×18" (45.7 mm×45.7 mm), and the total areal density of one fabric layer was 150 gsm. The 27 layers were then loosely stacked together to form the shoot pack. The layers were not bonded to each other. The areal density of the shoot pack was 0.84 psf (4.01 ksm).

For testing against fragment resistance, the shoot pack was mounted on a test frame and firmly clamped at the top of the frame. The frame was mounted at a 90-degree orientation to the line of fragment fired from a firmly mounted universal receiver. A 17 grain Fragment Simulating Projectile was used for testing and conformed to the shape, size and weight as per the MIL-P-46593A. $V_{50}$ ballistic testing was conducted in accordance with the procedures of MIL-STD-662E to experimentally determine the velocity at which a bullet has a 50 percent chance of penetrating the test object.

Several 17 grain FSP fragments were fired, changing the velocity of each fragment. The velocity of each fragment was moved down and up depending whether the previous fragment shot was a complete penetration or partially penetrated a few layers of the shoot pack. An average velocity was achieved by including a minimum of four partial penetrations and four complete fragment penetrations within a velocity spread of 125 fps (38.1 mps). The average velocity of the eight partial and complete penetrations was calculated and called $V_{50}$. The $V_{50}$ of this shoot pack was calculated as 1500 fps (457.2 mps). The Specific Energy Absorption of the Target (SEAT) was calculated as 27.86 J-m²/kg. A summary of the shoot pack structure and the test results are shown in Table 1.

EXAMPLE 2

Comparative

A ballistic shoot pack was prepared similar to Example 1 but including 33 stacked fabric layers. The areal density of the shoot pack was 1.00 psf (4.88 ksm). The pack was tested for fragment resistance as in Example 1. The $V_{50}$ of this shoot pack was calculated as 1705 fps (519.7 mps). The SEAT was calculated as 30.23 J-m²/kg. A summary of the shoot pack structure and the test results are shown in Table 1.

EXAMPLE 3

Comparative

A ballistic shoot pack was prepared similar to Example 1 but including 28 fabric layers. Also, in this example each fabric layer comprised 89.9% by weight of fiber based on the weight of the fibers plus the weight of the binder resin, and comprised 10.1% by weight of the binder resin based on the weight of the fibers plus the weight of the binder resin. The areal density of the shoot pack was 0.76 psf (3.71 kg/m²). The pack was testing for fragment resistance as in Example 1. The $V_{50}$ of this shoot pack was calculated as 1616 fps (492.6 mps). The SEAT was calculated as 35.7 J-m²/kg. A summary of the shoot pack structure and the test results are shown in Table 1.

EXAMPLE 4

A ballistic shoot pack including 11 fabric layers was prepared for testing of fragment resistance. The fabric layers were cut from a continuous laminated sheet of material that was formed having the structure illustrated in FIG. 2. Specifically, the material had the following construction: a) a first LLDPE film; b) four plies of unidirectional aramid fibers (1000 denier TWARON® fibers), said plies oriented at 0°,90°,0°,90° orientation; c) a second LLDPE film; d) four additional plies of unidirectional aramid fibers, said plies oriented at 0°,90°,0°,90° orientation; and e) a third LLDPE film.

The aramid fiber plies were coated with a water-based polyurethane thermoplastic binder material (Bayer DISPER-COLL® U53 polyurethane resin) and the plies were consolidated with the binder to form a monolithic non-woven fabric. The LLDPE films each had a thickness of 9 μm and an areal density of 16 gsm. Each fabric layer comprised 86% by weight of aramid fiber based on the weight of the fibers plus the weight of the binder resin, and comprised 14.0% by weight of binder resin based on the weight of the fibers plus the weight of the binder resin. This multi-ply material was laminated together at 110° C. under 200 psi (1379 kPa) pressure for 30 minutes forming a continuous fabric sheet having a thickness of 0.021 (0.533 mm). The sheet was cut to form 11 separate layers, each having a length and width of 18"×18", and the total areal density of one fabric layer was 459 gsm. The 11 layers were then loosely stacked together to form the shoot pack. The layers were not bonded to each other. The areal density of the shoot pack was 1.01 psf (4.94 ksm). The shoot pack was tested for fragment resistance as in Example 1. The $V_{50}$ of this shoot pack was calculated as 1841 fps (561.28). The SEAT was calculated as 34.89 J-m$^2$/kg. A summary of the shoot pack structure and the test results are shown in Table 1.

TABLE 1

| Ex. | Construction | Resin Content | Layers per shoot pack | Areal Density psf (ksm) | 17 grain FSP, V$_{50}$ fps (mps) | SEAT (J-m$^2$/kg) |
|---|---|---|---|---|---|---|
| 1 | SPECTRA SHIELD ® LCR | 20.5% | 27 | 0.84 (4.10) | 1500 (457.2) | 27.86 |
| 2 | SPECTRA SHIELD ® LCR | 20.5% | 33 | 1.00 (4.88) | 1705 (519.7) | 30.23 |
| 3 | SPECTRA SHIELD ® LCR | 10.1% | 28 | 0.76 (3.71) | 1616 (492.6) | 35.70 |
| 4 | LLDPE film/ non-woven plies/ LLDPE film/ non-woven plies/ LLDPE film | 16% | 11 | 1.01 (4.94) | 1841 (561.28) | 34.89 |

EXAMPLE 5

Comparative

Example 1 was repeated, only the shoot pack included 25 fabric layers and was tested against a 9 mm Full Metal Jacket bullet (bullet weight: 124 grain). The size of the shoot pack was 18"×18" (45.7 mm×45.7 mm). The areal density of the shoot pack was 0.78 psf (3.81 ksm). For testing against 9 mm FMJ bullet resistance, the shoot pack was mounted on a test frame filled with Plastilina #1 clay and strapped on the frame. The Plastilina filled frame was mounted at a 90-degree orientation to the line of fragment fired from a firmly mounted universal receiver. The 9 mm FMJ bullet used for testing confirmed the shape, size and weight as per the National Institute of Justice (NIJ) 0101.04 test standard.

Ballistic testing was conducted in accordance with the procedures of MIL-STD-662E. Several 9 mm FMJ bullets were fired, changing the velocity of each one. The velocity of each bullet was moved down and up depending whether the previous bullet shot was a complete penetration or partially penetrated a few layers of the shoot pack. An average velocity was achieved by including a minimum of four partial penetrations and four complete fragment penetrations within a velocity spread of 125 fps. The average of eight partial and complete penetration velocities was calculated and called V$_{50}$. The V$_{50}$ of this shoot pack was calculated as 1475 fps (449.6 mps) and the average backface deformation on Plastilina was measured as 39 mm. The SEAT was calculated as 210.87 J-m$^2$/kg. A summary of the shoot pack structure and the test results are shown in Table 2.

EXAMPLE 6

Comparative

A shoot pack as in Example 3 was tested against a 9 mm FMJ bullet as in Example 5. The areal density of the shoot pack was 0.77 psf (3.75 ksm). The V$_{50}$ of this shoot pack was calculated as 1620 fps (493.8 mps) and the average backface deformation on Plastilina was measured as 43 mm. The SEAT was calculated as 257.67 J-m$^2$/kg. A summary of the shoot pack structure and the test results are shown in Table 2.

EXAMPLE 7

Comparative

Example 6 was repeated with 9 mm FMJ bullet, but the resin content of the fabric was dropped from 10.1% to 7.0%. The areal density of the shoot pack was 0.77 psf (3.75 ksm). The V$_{50}$ of this shoot pack was calculated as 1571 fps (478.8 mps) and the average backface deformation on Plastilina was measured as 55 mm. The SEAT was calculated as 242.32 J-m$^2$/kg. A summary of the shoot pack structure and the test results are shown in Table 2.

EXAMPLE 8

A ballistic shoot pack was prepared by stacking 9 fabric layers of material described in Example 4. The stacked layers were not bonded to each other. The areal density of the shoot pack was 0.74 psf (3.61 ksm). The shoot pack was tested for V$_{50}$ against 9 mm FMJ bullets as in Example 5. The V$_{50}$ of this shoot pack was calculated as 1572 fps (479 mps) and average backface deformation on Plastilina was measured as 25 mm. The SEAT was calculated as 252.46 J-m$^2$/kg. A summary of the shoot pack structure and the test results are shown in Table 2.

TABLE 2

| Ex. | Construction | Resin Content | Layers per shoot pack | Areal Density psf (ksm) | 9 MM FMJ, V$_{50}$ fps (mps) | Deformation (mm) | SEAT (J-m$^2$/kg) |
|---|---|---|---|---|---|---|---|
| 5 | SPECTRA SHIELD ® LCR | 20.5% | 25 | 0.78 (3.81) | 1475 (449.6) | 39 | 210.87 |
| 6 | SPECTRA SHIELD ® LCR | 10.1% | 28 | 0.77 (3.75) | 1620 (493.8) | 43 | 257.67 |
| 7 | SPECTRA SHIELD ® LCR | 7% | 29 | 0.77 (3.75) | 1571 (478.8) | 55 | 242.32 |
| 8 | LLDPE film/ non-woven plies/ LLDPE film/ non-woven plies/ LLDPE film | 16% | 9 | 0.74 (3.61) | 1572 (479) | 25 | 252.46 |

EXAMPLE 9

Comparative

A peel strength test was conducted as per ASTM D1876-01 on the material described in Example 1. Ten 2-inch (5.08 cm)×12-inch (30.48 cm) sample strips were cut along either the 0° or 90° fiber direction from the fully laminated material sheet. Each of these samples were gripped at the left and right edges of one of the 2-inch wide ends in an INSTRON® testing machine, leaving a central portion about 1-inch (2.54 cm) wide for peel testing. This central portion of each sample was peeled at 90° to determine the peel strength between the 0° and 90° plies for each sample. The average peel strength of the ten samples was measured as 2.42 lbs. A summary of the material structure and the test results are shown in Table 3.

EXAMPLE 10

Comparative

A peel strength test was conducted as per Example 9 on ten 2-inch×12-inch sample strips cut from the material described in Example 3. The average peel strength of the ten samples was measured as 1.01 lbs. A summary of the material structure and the test results are shown in Table 3.

EXAMPLE 11

A peel strength test was conducted as per Example 9 on ten 2-inch×12-inch sample strips cut from the material described in Example 4. The average peel strength of the ten samples was measured as 2.62 lbs. A summary of the material structure and the test results are shown in Table 3.

TABLE 3

| Ex. | Construction | Resin Content | Peel Strength(lbs) |
| --- | --- | --- | --- |
| 9 | SPECTRA SHIELD ® LCR | 20.5% | 2.42 |
| 10 | SPECTRA SHIELD ® LCR | 10.1% | 1.01 |
| 11 | LLDPE film/ non-woven plies/ LLDPE film/ non-woven plies/ LLDPE film | 16% | 2.62 |

EXAMPLE 12

Comparative

The material of Example 1 was tested for water absorption per the ASTM 570-05 testing method. Three test samples, each in the form of a disk 2-inches (50.8 mm) in diameter, were soaked in a 4-inch (50.8 mm) wide 8-inch (101.6 mm) long glass beaker filled with tap water for 50 hours. A 1"×1"× 0.2" (25.4 mm×25.4 mm×5.1 mm) ceramic tile was placed on the samples so that samples would not float in the water. Water absorption was recorded at several time intervals by taking out one sample at a time from the water, wiping them off with a dry cloth and weighing the sample. A summary of the material structure and the test results are shown in Table 4.

EXAMPLE 13

The material of Example 4 was tested for water absorption following the same method used in Example 12. A summary of the material structure and the test results are shown in Table 4. As shown in the table, the water absorption rate of the material from Example 13 was lower than the absorption rate of the material from comparative Example 12.

TABLE 4

| Ex. | Construction | 0 minutes | 10 minutes | 30 minutes | 1 hour | 50 hours |
| --- | --- | --- | --- | --- | --- | --- |
| 12 | SPECTRA SHIELD ® LCR | Control | 6.3% | 6.7% | 6.9% | 17.2% |
| 13 | LLDPE film/ non-woven plies/ LLDPE film/ non-woven plies/ LLDPE film | Control | 3.1% | 3.5% | 3.9% | 12.6% |

EXAMPLE 14

Comparative

The material of Example 1 was tested for gasoline absorption as per the ASTM 570-05 guidelines. Similar to Examples 12 and 13, three test samples, each in the form of a disk 2-inches (50.8 mm) in diameter, were soaked in a 4-inch (50.8 mm) wide 8-inch (101.6 mm) long glass beaker filled with gasoline instead of water for four hours. A 1"×1"×0.2" (25.4 mm×25.4 mm×5.1 mm) ceramic tile was placed on the samples so that samples would not float in the gasoline. The effect of gasoline absorption was recorded by visual inspection of the sample. A summary of the material structure and the test results are shown in Table 5.

EXAMPLE 15

The material of Example 4 was tested for gasoline absorption following the same method used in Example 14. The effect of gasoline absorption was recorded by visual inspection of the sample. A summary of the material structure and the test results are shown in Table 5. As shown in the table, the samples in Example 14 showed separation of the fiber plies and the LDPE films in one minute after soaking in gasoline. However, the material in Example 15 showed no affect after soaking in gasoline for 4 hours.

TABLE 5

| Ex. | Construction | 0 minutes | 1 minute | 30 minutes | 1 hour | 4 hours |
| --- | --- | --- | --- | --- | --- | --- |
| 14 | SPECTRA SHIELD ® LCR | Control | Fiber Plies and LDPE Films Separated | N/A | N/A | N/A |
| 15 | LLDPE film/ non-woven plies/ LLDPE film/ non-woven plies/ LLDPE film | Control | No Affect | No Affect | No Affect | No Affect |

EXAMPLE 16

Comparative

The material of Example 1 was tested for salt water absorption per the ASTM 570-05 testing method. Three test samples, each in the form of a disk 2-inches (50.8 mm) in diameter, were soaked in a 4-inch (50.8 mm) wide 8-inch (101.6 mm) long glass beaker filled with a salt water mixture (comparable to sea water) for 270 hours. A 1"×1"×0.2" (25.4 mm×25.4 mm×5.1 mm) ceramic tile was placed on the samples so that samples would not float in the water. Water absorption was recorded at several time intervals by taking out one sample at a time from the water, wiping them off with a dry cloth and weighing the sample. A summary of the material structure and the test results are shown in Tables 6A and 6B.

EXAMPLE 17

The material of Example 4 was tested for water absorption following the same method used in Example 16. A summary of the material structure and the test results are shown in Tables 6A and 6B. As shown in the table, the water absorption rate of the material from Example 17 was lower than the absorption rate of the material from comparative Example 16.

TABLE 6A

| Ex. | Construction | 0 minutes | 10 minutes | 30 minutes | 1 hour |
|---|---|---|---|---|---|
| 16 | SPECTRA SHIELD ® LCR | Control | 4.32% | 4.71% | 5.09% |
| 17 | LLDPE film/ non-woven plies/ LLDPE film/ non-woven plies/ LLDPE film | Control | 1.50% | 2.72% | 3.16% |

TABLE 6B

| Ex. | Construction | 24 hours | 150 hours | 270 hours |
|---|---|---|---|---|
| 16 | SPECTRA SHIELD ® LCR | 7.53% | 9.79% | 9.79% |
| 17 | LLDPE film/ non-woven plies/ LLDPE film/ non-woven plies/ LLDPE film | 6.23% | 6.23% | 6.23% |

EXAMPLE 18

A five-ply material was formed including two unidirectional plies of TWARON® 1000 denier aramid fibers coated with a water-based polyurethane thermoplastic binder material (Bayer DISPERCOLL® U53) and three LLDPE films. The five-ply material was formed into a structure as illustrated in FIG. 1, i.e. LLDPE film/0° unitape/LLDPE film/90° unitape/LLDPE film. Each LLDPE film had a thickness of 9 μm and an areal density of 16 gsm. Each unidirectional ply comprised 86% by weight of aramid fiber based on the weight of the fibers plus the weight of the binder resin, and comprised 14% by weight of binder resin. The five-ply material was laminated together at 110° C. under 200 psi (1379 kPa) pressure for 30 minutes forming a monolithic continuous fabric sheet having a thickness of 0.021 (0.533 mm). The sheet was cut to form separate layers, each having a length and width of 18"×18", and the total areal density of one fabric layer was 116 gsm. Thirty-two separate layers were then loosely stacked together to form a ballistic shoot pack. The layers were not bonded to each other.

A dry shoot pack of this construction was subjected to ballistic testing against a 9 mm FMJ bullet (bullet weight: 124 grain), as described in Example 5, without prior soaking in water. A summary of the shoot pack structure and the ballistic test results are shown in Table 7.

EXAMPLE 19

A second shoot pack of this construction was soaked in sea water for 24 hours, followed by 15 minutes of vertical drip-drying to drain out any water trapped between the shoot pack layers. This shoot pack was then subjected to ballistic testing against a 9 mm FMJ bullet as in Example 18. A summary of the shoot pack structure and the ballistic test results are shown in Table 7.

TABLE 7

| Ex. | Condition | Resin Content | Layers per shoot pack | Areal Density psf (ksm) | 9 MM FMJ V50 fps (mps) | Backface Trauma (mm) |
|---|---|---|---|---|---|---|
| 18 | Control, dry | 17% | 32 | 0.76 (3.71) | 1289 (392.9) | 27 |
| 19 | Soaked in Sea Water for 24 hours | 17% | 32 | 1.00 (4.88) | 959 (292.3) | 27 |

EXAMPLE 20

The material of Example 18 was tested for water absorption as described in Example 12. A summary of the test results are shown in Table 8.

TABLE 8

| Ex. | 0 minutes | 10 minutes | 30 minutes | 1 hour | 24 hours |
|---|---|---|---|---|---|
| 20 | 0 | 6.6% | 6.8% | 7.1% | 15.6% |

EXAMPLE 21

The material of Example 18 was tested for gasoline absorption as described in Example 14. A summary of the test results are shown in Table 9.

TABLE 9

| Ex. | 0 minutes | 1 minute | 30 minutes | 1 hour | 4 hours |
|---|---|---|---|---|---|
| 21 | No affect | No affect | No affect | No affect | No affect |

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:
1. A fibrous composite material, comprising in order:
   a) a first outer polymer film;
   b) a first fibrous layer in contact with the first outer polymer film; the first fibrous layer comprising a plurality of fibers wherein said fibers are impregnated with a poly- meric binder material that is resistant to dissolution by water and resistant to dissolution by gasoline;

c) a central polymer film in contact with the first fibrous layer;

d) a second fibrous layer in contact with the central polymer film; the second fibrous layer comprising a plurality of fibers wherein said fibers are impregnated with a polymeric binder material that is resistant to dissolution by water and resistant to dissolution by gasoline; and e) a second outer polymer film in contact with the second fibrous layer;

wherein the first fibrous layer and the second fibrous layer each comprise fibers having a tenacity of about 7 g/denier or more and a tensile modulus of about 150 g/denier or more, wherein said polymeric binder material encapsulates each of the fibers such that 100% of the fiber surface area is covered with said binder material.

2. The fibrous composite material of claim 1 wherein the first fibrous layer and the second fibrous layer each comprise a single ply of non-woven, non-overlapping fibers that are aligned in a substantially parallel array.

3. The fibrous composite material of claim 2 wherein the parallel fibers of said first fibrous layer are positioned orthogonally to the parallel fibers of said second fibrous layer, relative to the longitudinal fiber direction of each fiber ply.

4. The fibrous composite material of claim 1 wherein the first fibrous layer and the second fibrous layer each comprise a plurality of consolidated non-woven fiber plies.

5. The fibrous composite material of claim 1 wherein the first fibrous layer and the second fibrous layer each comprise a plurality of overlapping non-woven fiber plies that are consolidated into a single element, wherein each ply comprises fibers aligned in a substantially parallel array and wherein each ply of a fibrous layer is positioned orthogonally to the parallel fibers of each adjacent ply within that fibrous layer relative to the longitudinal fiber direction of each fiber ply.

6. The fibrous composite material of claim 1 wherein the first fibrous layer and the second fibrous layer each consist of fibers that are impregnated with a polymeric binder material.

7. The fibrous composite material of claim 1 wherein said fibers of each fibrous layer comprise polyolefin fibers, aramid fibers, polybenzazole fibers, polyvinyl alcohol fibers, polyamide fibers, polyethylene terephthalate fibers, polyethylene naphthalate fibers, polyacrylonitrile fibers, liquid crystal copolyester fibers, rigid rod fibers comprising pyridobisimidazole-2,6-diyl(2,5-dihydroxy-p-phenylene), or a combination thereof.

8. The fibrous composite material of claim 1 wherein said polymeric binder material that is resistant to dissolution by water and resistant to dissolution by gasoline comprises a hydrolytically stable, polar polymer.

9. The fibrous composite material of claim 1 wherein said polymeric binder material that is resistant to dissolution by water and resistant to dissolution by gasoline comprises a polar, vinyl-based polymer.

10. The fibrous composite material of claim 1 wherein said polymeric binder material that is resistant to dissolution by water and resistant to dissolution by gasoline comprises a non-polar polymer modified with polar groups.

11. The fibrous composite material of claim 1 wherein said polymeric binder material that is resistant to dissolution by water and resistant to dissolution gasoline comprises a polar, hydrolytically stable thermoplastic polyurethane.

12. The fibrous composite material of claim 1 wherein said first outer polymer film, said central polymer film and said second outer polymer film comprise polyolefins, polyamides, polyesters, polyurethanes, vinyl polymers, fluoropolymers, or copolymers or combinations thereof.

13. The fibrous composite material of claim 1 wherein said first outer polymer film, said central polymer film and said second outer polymer film each comprise linear low density polyethylene.

14. The fibrous composite material of claim 1 wherein said polymeric binder material comprises from about 3% to about 16% by weight of each the first fibrous layer and the second fibrous layer.

15. A ballistic resistant article formed from the fibrous composite material of claim 1.

16. A method of forming a fibrous composite material, comprising:

a) providing a first outer polymer film;

b) attaching a first fibrous layer to the first outer polymer film; the first fibrous layer comprising a plurality of fibers wherein said fibers are impregnated with a polymeric binder material that is resistant to dissolution by water and resistant to dissolution by gasoline;

c) attaching a central polymer film to the first fibrous layer;

d) attaching a second fibrous layer to the central polymer film; the second fibrous layer comprising a plurality of fibers wherein said fibers are impregnated with a polymeric binder material that is resistant to dissolution by water and resistant to dissolution by gasoline; and e) attaching a second outer polymer film to the second fibrous layer;

wherein the first fibrous layer and the second fibrous layer each comprise fibers having a tenacity of about 7 g/denier or more and a tensile modulus of about 150 g/denier or more, wherein said polymeric binder material encapsulates each of the fibers such that 100% of the fiber surface area is covered with said binder material.

17. The method of claim 16 wherein the first fibrous layer and the second fibrous layer each comprise a single ply of non-woven, non-overlapping fibers that are aligned in a substantially parallel array.

18. The method of claim 17 wherein the parallel fibers of said first fibrous layer are positioned orthogonally to the parallel fibers of said second fibrous layer, relative to the longitudinal fiber direction of each fiber ply.

19. The method of claim 16 wherein the first fibrous layer and the second fibrous layer each comprise a plurality of consolidated non-woven fiber plies.

20. The method of claim 16 wherein the first fibrous layer and the second fibrous layer each comprise a plurality of overlapping non-woven fiber plies that are consolidated into a single element, wherein each ply comprises fibers aligned in a substantially parallel array and wherein each ply of a fibrous layer is positioned orthogonally to the parallel fibers of each adjacent ply within that fibrous layer relative to the longitudinal fiber direction of each fiber ply.

21. The method of claim 16 wherein the first fibrous layer and the second fibrous layer each comprise a woven array of fibers.

22. The method of claim 16 wherein said polymeric binder material that is resistant to dissolution by water and resistant to dissolution by gasoline comprises a polar, vinyl-based polymer.

23. The method of claim 16 wherein said polymeric binder material that is resistant to dissolution by water and resistant to dissolution by gasoline comprises a polar, hydrolytically stable thermoplastic polyurethane, which polyurethane has been modified with polar groups.

24. The method of claim 16 wherein said first outer polymer film, said central polymer film and said second outer polymer film comprise polyolefins, polyamides, polyesters, polyurethanes, vinyl polymers, fluoropolymers, or copolymers or combinations thereof.

25. The method of claim 16 wherein said polymeric binder material comprises a hydrolytically stable, polar polymer or comprises a non-polar polymer modified with polar groups.

* * * * *